May 24, 1932.  A. MARCHAND  1,859,592
DISAPPEARING MIRROR LIGHT
Filed Nov. 13, 1931    3 Sheets-Sheet 1
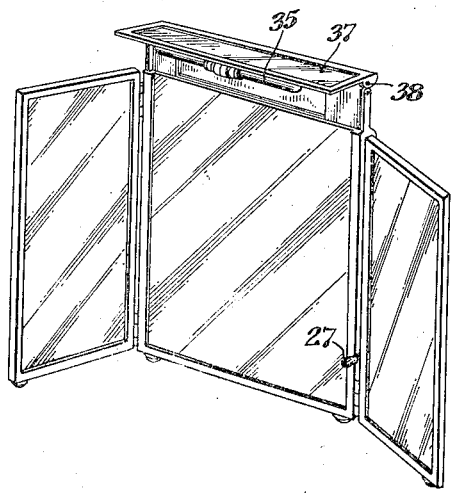
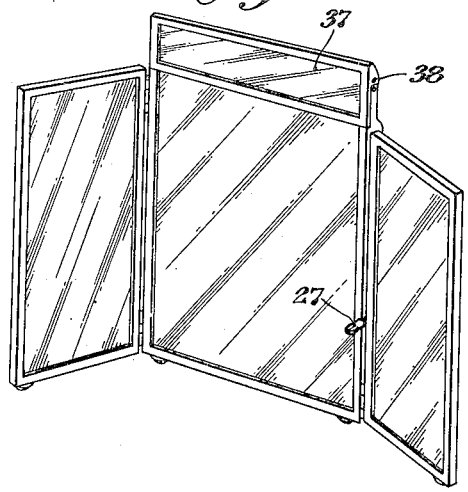
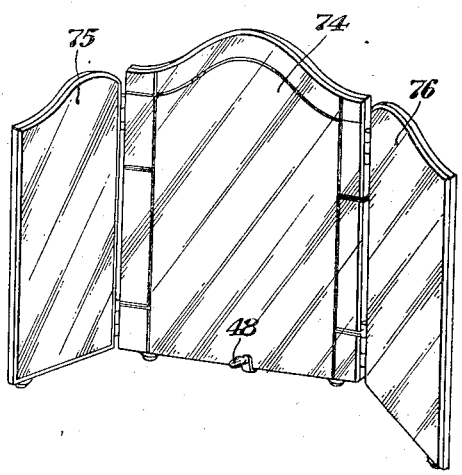
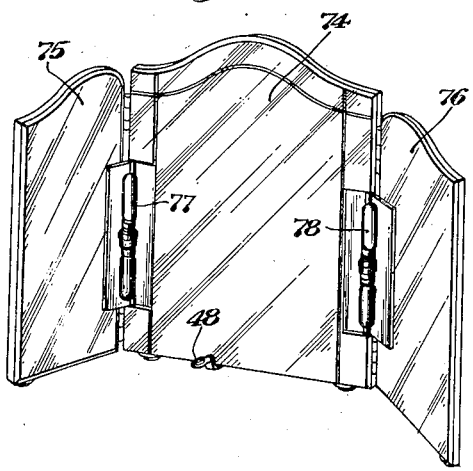
INVENTOR
Adolph Marchand
BY
ATTORNEY

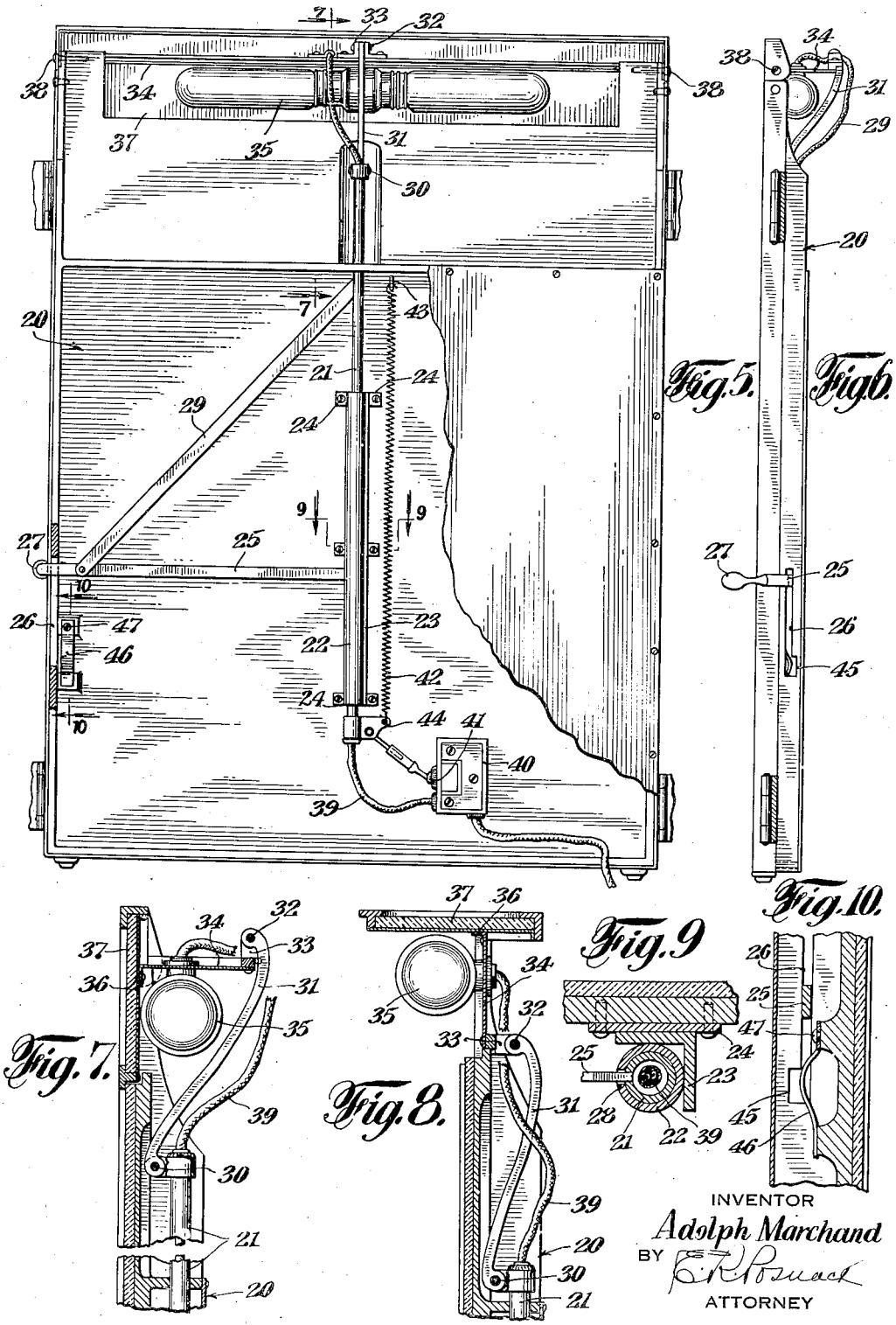

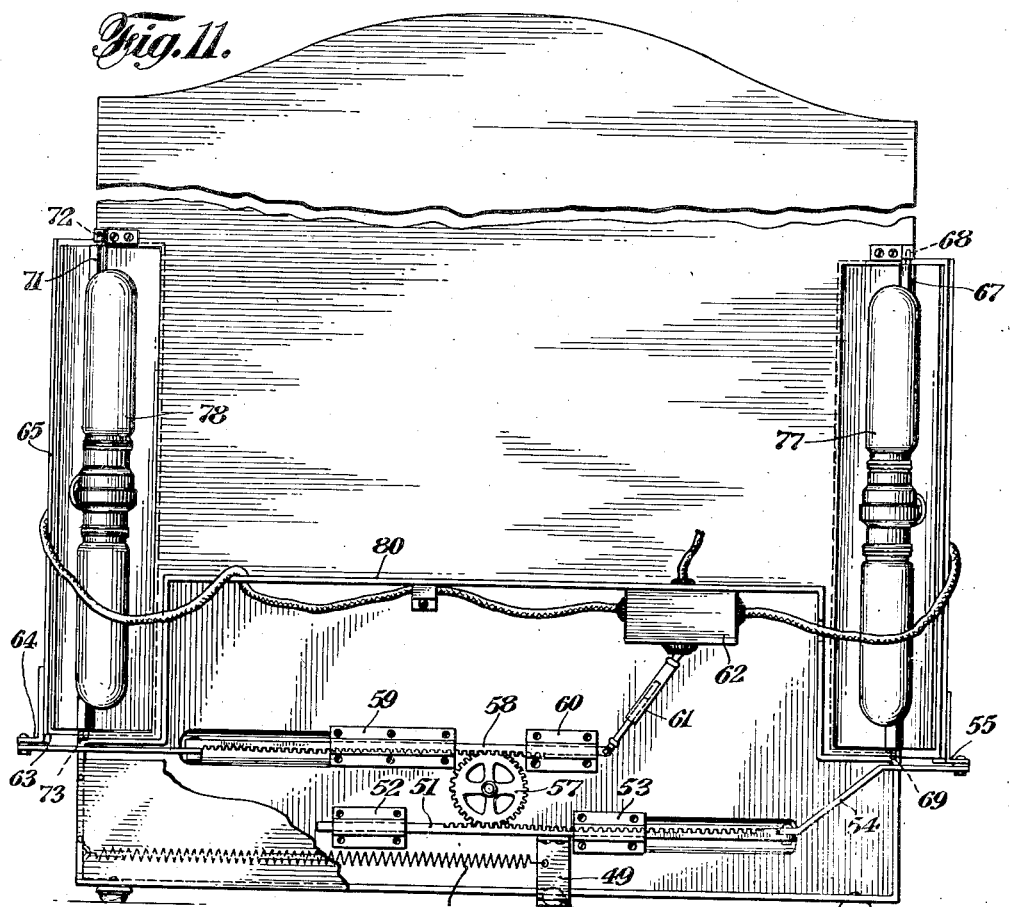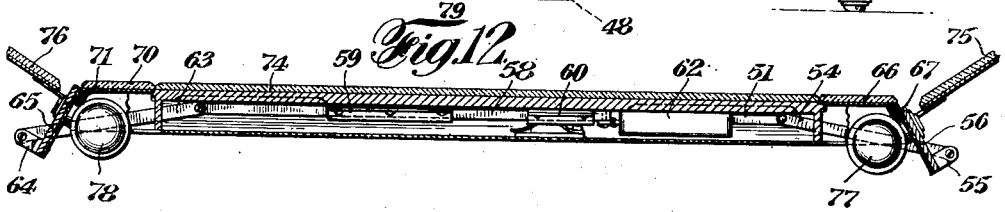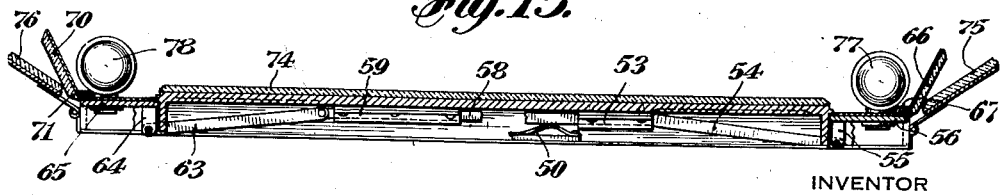

Patented May 24, 1932

1,859,592

UNITED STATES PATENT OFFICE

ADOLPH MARCHAND, OF JACKSON HEIGHTS, NEW YORK

DISAPPEARING MIRROR LIGHT

Application filed November 13, 1931. Serial No. 574,729.

This invention relates to lights associated with mirrors used on dressers and the like, and that can be removed from view behind the mirror when not in use,—this application being an improvement of that filed by me on March 9, 1931, Serial No. 521,085.

An object of this invention is to enable an arrangement of lights to be so attached to a mirror, either at the top thereof or at its sides, as to be visible only when needed, and capable of being quickly and easily made to disappear from sight behind one or more panels which ordinarily form either a part of the mirror proper or its frame.

Another object is to facilitate the operations of bringing the light into its operative and inoperative positions; and still another object is to simplify the construction of a device of this kind and render it relatively cheap to build and compact in form.

A further object of my invention is to enable a single manipulation by an operator to simultaneously actuate an electric switch and move an arrangement of either one or more lights into an operative or inoperative position as the case may be.

Other objects, features and advantages will appear from the drawings, and the description hereinafter given.

Referring to the drawings,

Figure 1 is a perspective view of a mirror embodying my invention, showing a light at the top of the mirror in its operative position.

Figure 2 shows the mirror of Figure 1 with the light hidden from view behind the top panel.

Figures 3 and 4 are similar to Figures 1 and 2, except that instead of having one light at the top, the mirror has two lights at the sides thereof, between its central portion and its wings.

Figure 5 is a rear view of the central portion of the mirror of Figures 1 and 2 with part of the back cover broken away and disclosing the operating mechanism, the light being shown hidden from view.

Figure 6 is a side elevation of Figure 5.

Figures 7 and 8 are sectional elevations taken along line 7—7, the former showing the light in its inoperative position, and the latter showing it in its operative or exposed position.

Figure 9 is a fragmentary sectional plan taken along line 9—9.

Figure 10 is a longitudinal section along line 10—10 showing the spring arrangement to hold the hand operable lever within the notch in the slot.

Figure 11 is a rear view of the central portion of the mirror of Figures 3 and 4, the back cover being removed.

Figure 12 is a section along line 12—12, showing the lights hidden from view.

Figure 13 is a section along line 13—13, showing the lights exposed to view.

In the drawings, the casing 20, attached to the rear of the mirror, contains the operating mechanism to actuate this device. The hollow stem 21, which may be of standard metallic tubing, is slidably movable within the tubular guiding member 22 which is secured to the back portion of the mirror by the angle bar 23 and the supporting brackets 24. The cross bar 25 has one end thereof extending through the slot 26 and being attached to the finger 27, the other end of said cross bar extending through the slot 28 in member 22 and being affixed to stem 21. The diagonal member 29, attached to cross bar 25 and stem 21, is used to brace the arrangement structurally.

The stem 21 has pivotally secured to the top thereof at 30, the lower end of arm 31, the upper end being pivotally attached, at 32, to the bracket 33 attached to the wall 34 to which the light 35 is secured. The said wall 34 has a flanged portion 36 abutting the rear of the panel 37, and is attached thereto by suitable means so that the wall 34 and panel 37 are at right angles to each other. The panel 37 is pivotally mounted on the framework of the mirror by means of the pins 38, so that a downward movement of stem 21 and consequently arm 31 from its position shown in Figure 7 will cause the panel and wall 34 to rotate about said pins, and be brought to the position shown in Figure 8 where the light is exposed to view.

It will be noted that the wire 39 extends through the tubing 21 up to the light 35, the lower end of said wire being plugged into the switch box 40 which is operatively connected with the tubular stem 21 by the toggle switch 41 the upper end of which is pivotally connected to the bottom of stem 21.

Normally, the light 35 is hidden from view and the front or mirror portion of panel 37 is substantially flush with the surface of the mirror proper, giving no outward appearance that said panel hides a light or is used for any purpose other than that of enhancing the ornamental value of the mirror. The finger 27 is kept at the top of the slot 28 by the action of the helical spring 42 which is anchored at 43 and attached to the bottom of stem 21 at 44. To bring the light to view, the finger 27 is moved downwardly within slot 26, against the action of the spring, until the extending portion of the cross bar 25 is forced into the notch or recessed portion 45 by the flat spring 46, one end of which is fastened to the framework at 47, the other end being free and slidably engageable with an adjacent portion of the framework, and the middle portion being curved outwardly away from said framework and towards said recessed portion of slot 26. The upward tension of the spring 42 will hold the bar 25 within notch 45 until it is removed therefrom by a manual pull on the finger 27, thereby releasing it from engagement with said notch to permit an upward movement of said cross-bar within the slot. Although the finger 27 can be pushed upwardly, in the operation of returning the light to its hidden position, the tension of the spring can be so adjusted as to slowly bring it up without manual aid. At any rate, the spring 42 can be used to facilitate the upward movement of said finger, without requiring much effort on the part of the operator.

A modification of this invention is disclosed in Figures 11, 12 and 13, showing an arrangement with two lights at the sides of the central portion of the mirror, rather than one at its top. The operating finger 48 is at the bottom of the mirror and is attached to the bar 49 which slidably engages a slot (not shown) and is held within a notch by the spring member 50 is a similar manner to that hereinbefore set forth in the description of the single light arrangement. The bar 49 is secured to a rack 51 which is slidably supported by the brackets 52 and 53, one end of said rack being pivotally attached to the link 54 which in turn is pivotally attached to the bracket 55 of the light-carrying wall 56. The pinion 57, mounted on the back portion of the mirror, is in operative engagement with the teeth on rack 51 and rack 58, the latter being slidably supported by the brackets 59 and 60. One end of rack 58 is pivotally attached to the toggle switch 61 which is operatively connected to the switch box 62; the other end of rack 58 being pivotally attached to link 63 which is in turn pivotally attached to the bracket 64 of the light-carrying wall 65.

The panel 66 and the wall 56 are both attached to the supporting bar 67 which is pivotally mounted on the framework of the mirror by pins 68 and 69; and the panel 70 and wall 65 are both similarly attached to the supporting bar 71 which is pivotally mounted on the framework of the mirror by the pins 72 and 73.

Normally the panels 66 and 70 have their surfaces flush with the front surface of the mirror 74, the wings 75 and 76 hiding the walls 56 and 65, the panels hiding the lights—so that the two said panels appear to serve only an ornamental purpose.

To operate the device, the finger 48 is moved within the slot, causing a corresponding movement of rack 51. Through the medium of the geared arrangement, racks 51 and 58 will move in opposite directions, rack 51 actuating link 54 and swinging the light 77 in or out of position, as the case may be, and rack 58 simultaneously actuating switch 61 and light 78 through link 63. It will thus be seen that by a simple manipulation, the two side lights can be brought into view and the current simultaneously turned on.

It will be noted that the spring 79, anchored to the framework and attached to member 49, is arranged to be in tension, facilitating the manual operation of this device by helping to overcome the frictional resistance of the parts, as in the case of the first form of this invention hereinbefore described. It will also be observed that the casing occupies but a part of the rear of the mirror, resulting in a compact design. In fact, in both forms of my invention herein described, the casing housing the mechanism is relatively flat, enabling the mirror with which either form is associated to be placed close to the wall and thereby not disclosing the presence of a mechanical contrivance.

This invention is not limited to the two forms herein described, as other embodiments thereof can be employed all within the scope of the appended claims.

What I claim is:

1. A mounting for a mirror light comprising a panel pivotally mounted on the framework of the mirror associated therewith, a lamp-carrying wall having one edge thereof attached to the rear of said panel, the opposite edge thereof having attached thereto a bracket, said pivotal mounting being on a line coextensive with the juncture of said panel and said wall, an arm pivotally connected to said bracket, and means for actuating said arm to effect a movement of said panel and wall assembly about said pivotal mounting as an axis to bring said lamp-carrying wall to an exposed position.

2. A lighting device for a mirror comprising a lamp, a mounting for said lamp pivotally attached to the frame of the mirror associated therewith, and means for pivotally actuating said mounting to bring said lamp from a concealed position behind the mounting to an exposed position for illuminating a person in front of the mirror, said means comprising an arm pivotally connected to said mounting, a hand-operable member extending forwardly from the rear of said mirror to beyond the front surface thereof, a cross bar attached to said member and positioned in the rear of said mirror, slotted means within which said bar is slidably engageable, connecting means between said bar and said arm, yieldable means coacting with said first-mentioned means for actuating said mounting, and means operable against said yieldable means to hold said hand-operable member against movement in its starting and projected positions respectively.

3. A lighting device for a mirror comprising a lamp, a mounting for said lamp pivotally attached to the frame of the mirror associated therewith, and means for pivotally actuating said mounting to bring said lamp from a concealed position behind the mounting to an exposed position for illuminating a person in front of the mirror, said means comprising an arm pivotally connected to said mounting, a hand-operable member extending forwardly from the rear of said mirror to beyond the front surface thereof, a cross bar attached to said member and positioned in the rear of said mirror, slotted means within which said bar is slidably engageable, connecting means between said bar and said arm, a switch electrically connected to said lamp, and means to cause a single manipulation of said hand-operable member to actuate both said arm and said switch.

4. A lighting device for a mirror comprising a lamp, a mounting for said lamp consisting of a panel and a wall attached to the rear thereof and at an angle thereto, said lamp being attached to said wall and positioned behind said panel, said panel being pivotally mounted on the framework of the mirror with which it is associated and being normally flush with the surface of the mirror, and actuating means for pivotally moving said panel and wall assembly to bring said lamp from its concealed position behind said panel to an exposed position for illuminating a person in front of the mirror, said actuating means comprising an arm pivotally attached to said wall, a hollow stem one end of which is pivotally attached to said arm, a tubular guiding member within which said stem is slidably movable, a longitudinal slot in said member, a crossbar one end of which extends through said slot and is affixed to said stem, a finger for manual operation attached to said cross bar, yieldable means operable on said stem to actuate it in a direction to normally keep said panel closed, a switch electrically connected to said lamp by wires running through said hollow stem, and means connecting said stem and said switch to cause a movement of the stem to operate the switch.

5. In a lighting device of the class described two panels pivotally mounted at opposite sides of the mirror with which said device is associated and having their front surfaces substantially coextensive with the surface of said mirror when in their normally inoperative positions, an arrangement of lamps at the rear of each of said panels, and actuating means associated with said panels to cause a single manipulation to simultaneously swing both said panels about their pivotal mountings to bring said lamps to an exposed position for illuminating a person in front of said mirror.

6. In a lighting device associated with a mirror, two panels positioned at opposite sides of the mirror and pivotally mounted thereon, each panel having a wall attached to the rear thereof and at an angle thereto, an arrangement of lamps attached to each of said walls and positioned behind said panels, wings associated with the mirror at either side thereof and positioned at the extreme sides of said panels and extending forwardly thereof so as to hide the said walls when in their concealed positions, and actuating means to cause a single manipulation to simultaneously swing both said panels about their respective pivotal mountings to bring said walls and the lamps attached thereto into view at the front of the mirror.

7. A lighting device for a mirror comprising two pivotally connected mountings at opposite sides of the mirror, a set of lamps attached to the rear of each of said mountings, and actuating means for effecting a pivotal movement of said mountings to bring said lamps into view at the front of the mirror, said means comprising two arms pivotally associated with said mounting, a pinion attached to the rear of said mirror, two geared racks on opposite sides of said pinion and in engagement therewith, means for supporting and guiding said racks, a hand-operable member, a bar connecting said member with one of said racks which is pivotally attached to one of said arms, the other of said racks being pivotally attached to the other of said arms, a switch electrically connected to said lamps, and means associated with said actuating means and connected to said switch to cause a single manipulation of said hand-operable member to actuate both said mountings and said switch.

8. A lighting device for a mirror comprising two panels positioned at opposite sides of the mirror and pivotally mounted thereon, each panel having a wall attached to the rear thereof and at an angle thereto, an arrangement of lamps attached to each of said walls and positioned behind said panels, and actuating means to cause a single manipulation to simultaneously swing both said panels about their respective pivotal mountings to bring said walls and the lamps attached thereto into view at the front of the mirror, said means comprising two arms pivotally associated with said panels, a pinion attached to the rear of said mirror, two geared racks on opposite sides of said pinion and in engagement therewith, means for supporting and guiding said racks, a hand-operable member, a bar connecting said member with one of said racks which is pivotally attached to one of said arms, the other of said racks being pivotally attached to the other of said arms, a switch electrically connected to said lamps, and means associated with said actuating means and connected to said switch to cause a single manipulation of said hand-operable member to actuate both said panels and said switch.

In testimony whereof, I affix my signature.

ADOLPH MARCHAND.